Oct. 11, 1966  H. R. VON ARX  3,277,920

ENGINE RELIEF AND TESTING VALVE

Filed Nov. 5, 1963

INVENTOR.
Henry R. von Arx
BY
Lothrop & West
ATTORNEYS

United States Patent Office 3,277,920
Patented Oct. 11, 1966

3,277,920
ENGINE RELIEF AND TESTING VALVE
Henry R. von Arx, Berkeley, Calif., assignor to General Metals Corporation, Oakland, Calif., a corporation of California
Filed Nov. 5, 1963, Ser. No. 321,487
5 Claims. (Cl. 137—522)

The invention relates to a device especially useful in connection with internal combustion engines, particularly with compression ignition engines of substantial size and which normally have available air under pressure for starting and other purposes.

In the operation of internal combustion engines, particularly diesel engines of substantial size or engines running on mixed or multiple fuels, it is often desirable to reduce or give warning of excessive pressure within the engine combustion chamber to avoid damage. Also, it is often desirable to have a close connection to the engine combustion chamber for an engine indicator or other pressure responsive device. As a further matter, it is often helpful before starting an idle engine to determine if water has leaked from the cooling jacket into the combustion chamber. Additionally, in barring an engine over during timing checks and the like, it is desired to maintain the pressure within the cylinder as closely as possible at atmospheric pressure to reduce the work or revolving the engine to a precise point.

It is therefore an object of my invention to provide an engine relief and testing valve which will open automatically in response to excess pressure within the combustion chamber of the engine.

Another object of the invention is to provide an engine relief and testing valve in which air under pressure is utilized to operate the valve for establishing communication between the combustion chamber and the atmosphere.

A still further object of the invention is to provide an engine relief and testing valve having a means for connecting an indicator or other pressure responsive device thereto.

An additional object of the invention is to provide a simple, self-contained and unitary engine relief and testing valve that can readily be adapted to the cylinder of an internal combustion engine.

A further object of the invention is to provide a valve of the sort identified which can readily be attached to the normally available compressed air supply.

A further object of the invention is to provide an engine relief and testing valve of simple construction and arrangement so that it will operate instantly when required even though it has been quiescent over a long period of time.

Figure 1:
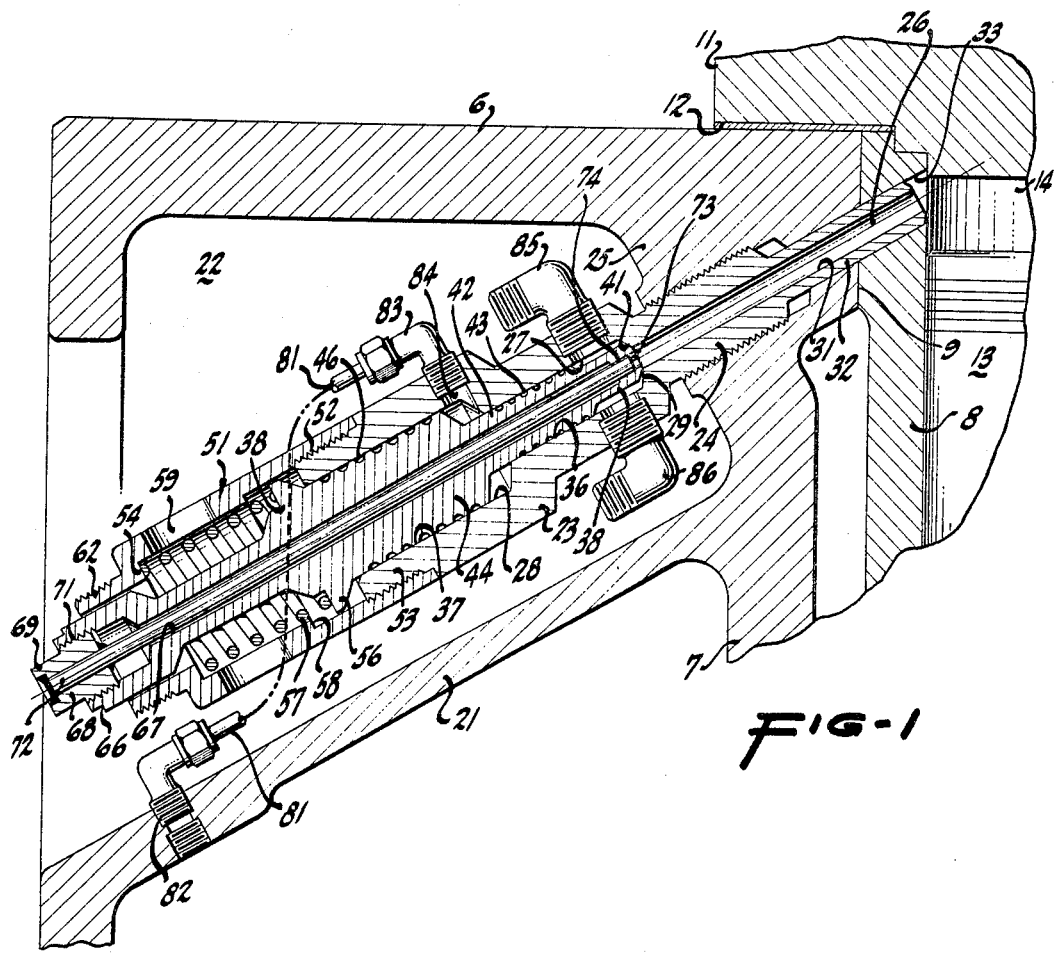
Figure 2:
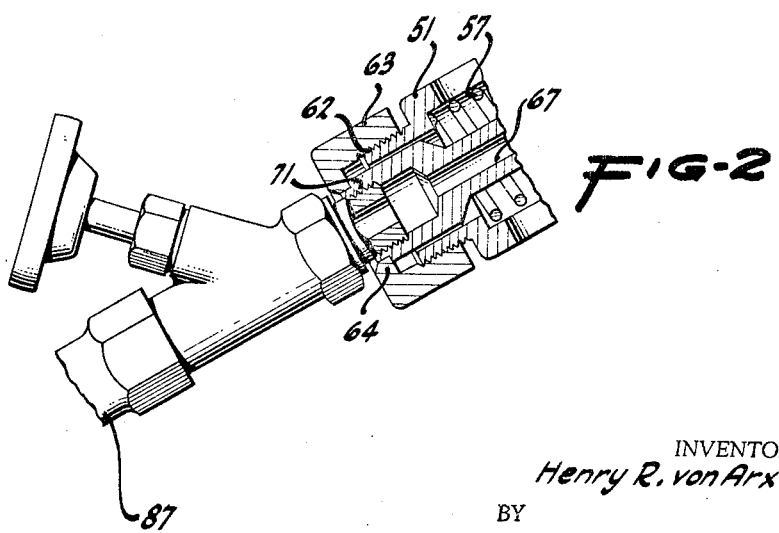

Other objects together with the foregoing are attained in the embodiment of the invention described in the accompanying description and illustrated in the accompanying drawings, in which:

FIGURE 1 is a cross section through a portion of an internal combustion engine especially showing the combustion chamber thereof and also illustrating in cross section on a vertical axial plane an engine relief and testing valve in installed location; and FIGURE 2 is a fragmentary detail showing the arrangement of the engine relief and testing valve with an indicator or pressure device installed thereon.

The engine relief and testing valve pursuant to the invention can be utilized in a number of different environments and under various operating circumstances, but has successfully been utilized on relatively large internal combustion or diesel engines.

In a typical environment, the engine includes a main cylinder casting 6 having a jacket wall 7 with which a cylinder liner 8 cooperates. The liner conveniently fits against the wall 7 along a cylindrical junction surface 9. A cylinder head 11 overlies the casting 6 and assists in holding the liner 8 in place. A gasket 12 is interposed between the head, the casting 6 and the upper end of a part of the liner 8. Designed to reciprocate within the cylinder liner 8 is a piston 13 of the customary sort defining a combustion chamber 14 between the piston head, the liner walls and the cylinder head 11. The remaining part of the engine is substantially of a standard nature. When the engine operates, the pressure within the combustion chamber 14 fluctuates, although a desired maximum pressure is not normally exceeded.

Pursuant to the invention, the casting 6 is preferably provided with a bounding wall 21 defining a compartment 22 opening to the atmosphere and of a convenient size to receive the engine relief and testing valve. The valve itself includes a valve body 23 at one end having a threaded boss 24 designed to be screwed into a threaded socket 25 within the casting 6. The body itself is generally symmetrical about a longitudinal axis 26 and is generally hollow in part to define a primary chamber 27 symmetrically disposed with respect to the axis 26. Also arranged within the body is a secondary chamber 28 spaced from the primary chamber 27 and symmetrical with regard to the axis 26.

In alignment with the primary chamber and in fact communicating therewith at a shoulder 29 is an axial passageway 31 extending through the boss 24 and also extending through a tubular extension 32 projecting from the boss and adapted to lie within a corresponding bore 33 in the casting 6 and in the cylinder lining 8 to open into the combustion chamber 14.

Between the primary chamber 27 and the secondary chamber 28 is a primary cylinder 36 machined within the body and in axial alignment with the two chambers 27 and 28. Somewhat similarly, there is a secondary cylinder 37 also machined within the body symmetrically with regard to the axis 26, but the secondary cylinder as well as the secondary chamber 28 are considerably larger in diameter than the primary cylinder 36 and the primary chamber 27.

Arranged to operate within the valve body and symmetrical with respect to the axis 26 is a valve spool 38. This preferably at one end has a valve seat 41 thereon in position to abut the shoulder 29 and when in such abutment to preclude communication between the passage 31 and the chamber 27. When the valve seat and the shoulder 29 are separated, then there is free communication between the passageway 31 and the chamber 27.

The valve spool is only slightly enlarged adjacent the seat 41, but it is substantially enlarged to provide a primary piston 42 freely reciprocable within the primary cylinder 36. To act as a packing or labyrinth seal, the piston 42 is provided with a number of circumferential grooves 43 to assist in precluding leakage. The piston 42 extends partway into the secondary chamber 28 to leave a substantially unoccupied volume therein, but merges then with an enlarged secondary piston 44 formed as part of the valve spool. The secondary piston is freely reciprocable within the secondary cylinder. A labyrinth packing or seal 46 is made up of a number of grooves around the secondary piston.

Detachably engaging the valve body is a cap 51 of generally cylindrical form disposed symmetrically with regard to the axis 26 and having a threaded portion 52 which engages with a similar threaded portion 53 on the valve body. By rotation, the valve cap is readily seated or removed. The valve cap 51 is provided with a shoulder 54 in opposition to a flange 56 outstanding from the valve body. A helical spring 57 is seated against the shoulder 54 and against the flange 56 so that normally the valve body is urged in a direction to cause the seat 41 to abut the shoulder 29. The cap 51 has also a shoulder or ledge 58 which extends inwardly far enough so as to be in the path of the outermost portion of the flange 56. Thus the valve spool is confined between a seated position, as shown in FIGURE 1, and an outermost position with the flange 56 in abutment with the shoulder 58 of the cap 51. The interior of the cap is made freely accessible to the atmosphere through a pair of openings 59 of large size.

The cap itself is provided with a threaded portion 62 to receive either a standard protecting cap nut (not shown) or to receive a securing ring nut 63 (FIGURE 2) capable of holding the valve spool seated by virtue of engagement between an inturned flange 64 on the nut and a corresponding shoulder 66 at the end of the valve spool.

The valve spool is likewise hollow or has a through passage 67 therein extending from one end of the valve spool to the other. While this passage can be open, it is normally closed by means of a plug 68 having a wrench-engaging portion 69 thereon and also carrying a threaded portion 71 in engagement with a comparable internally threaded portion at one end of the valve spool. Further, the plug 68 carries a rod 72 conveniently welded therein at one end and designed to extend with a loose fit through the passageway 67 to reduce the volume of the passageway. A cylindrical inner terminus 73 on the rod makes a close fit with a cylindrical bore 74 at the inturned end of the valve spool. When the plug 68 is positioned, there is no flow through the valve spool, but when the plug 68 is withdrawn, as shown in FIGURE 2, there may be flow through the passageway 67, thus establishing communication through the valve body and the valve spool between the combustion chamber 14 and the exterior atmosphere.

Pursuant to the invention, there is a connection made between the secondary chamber 28 and a source of compressed air. While any suitable source can be utilized, preferably a conduit 81 is extended to a supply point 82 in the casting 6 and also connected to a fitting 83 leading to a passage 84 opening into the secondary chamber 28. The source of compressed air connected to the supply point 82 is provided with the customary pressure regulator and control valve, not shown.

Also usually mounted on the valve body are a couple of elbows 85 and 86 which communicate with the primary chamber 27 and are directed generally outwardly.

In the operation of this device, the valve is completely mounted as shown in FIGURE 1 and the source of compressed air is joined to the conduit 81, but no air pressure is furnished so that the valve is normally closed. The plug 68 is normally in position. Under these circumstances, when the engine is operating and the piston 13 is reciprocating within the cylinder and combustion takes place within the chamber 14, the valve does not open so long as the combustion pressure remains within a desired range. When, however, the combustion chamber exceeds a set pressure, as established by the spring 57, then the superior pressure within the combustion chamber 14 acting on the valve spool and rod moves the valve spool to the left in FIGURE 1. This compresses the spring 57 and moves the valve seat 41 off of the shoulder 29, thus permitting the excess gas to flow outwardly through the elbows 85 and 86 to the atmosphere. If the excess pressure is slight, it is fully relieved in this way, but if the excess is large, it may not be entirely reduced since the passages are small. But in every case, the escaping gas causes a whistling noise serving to warn the operator of abnormal behavior of the engine. When the excess cylinder or combustion chamber pressure drops, the spring 57 reseats the valve spool. Because of the labyrinth packing, there is little leakage past the first chamber or the primary chamber when the valve spool is unseated.

Before the engine is started after protracted idleness, it is desirable to check for leakage water in the combustion chamber 14. Under those circumstances, compressed air is admitted to the chamber 28. This has the effect, due to the differential diameter of the primary piston and of the secondary piston, of translating the valve spool to the left against the urgency of the spring 57 and to lift the valve seat 41 from the shoulder 29. This allows the expulsion of water from the chamber 14 through the elbows 85 and 86 when the engine is slowly rotated and affords a visual warning of the leakage. When the engine is revolved slowly with the valve held open, the chamber 14 is relieved of any large pressure difference from the atmosphere. The engine can be motored or barred over without the normal compression or induction resistance.

When the pressure within the combustion chamber 14 is to be measured or indicated, the plug 68 and its rod 72 are removed. This opens the passageway through the valve spool. A suitable indicator 87 or comparable device is attached to the valve spool and the valve spool is held in fixed, axial position by the collar nut 63. When the engine is operated, the pressure within the cylinder or combustion chamber 14 is not effective to open the valve by moving the valve spool, but is registered on the indicator.

What is claimed is:

1. An engine relief and testing valve comprising a valve body having an axis, means defining a primary chamber in said body on said axis, means in said valve body connecting said primary chamber with the atmosphere, means defining a secondary chamber in said body on said axis, means in said valve body connecting said secondary chamber with a source of fluid under pressure, means defining an axial passageway in said body opening at one end of said body and opening into said primary chamber, means defining a primary cylinder in said body extending axially between said primary chamber and said secondary chamber, means defining a secondary cylinder in said body extending axially between said secondary chamber and the other end of said body, a valve spool disposed coaxially within said body and having an axial passage extending therethrough and opening only at the opposite ends of said valve spool, a valve seat on one end of said spool adapted to seat on said valve body at the junction of said axial passageway and said primary chamber, means forming a primary piston on said valve spool reciprocable in said primary cylinder, means forming a secondary piston on said valve spool reciprocable in said secondary cylinder, a spring, means mounting said spring against said valve spool and said valve body to urge said valve spool axially in a direction to press said valve seat against said valve body, and a removable plug on said valve spool closing said axial passage.

2. An engine relief and testing valve as in claim 1 in which said secondary cylinder is larger in diameter than said primary cylinder and means are provided for supplying said secondary cylinder with air under pressure.

3. An engine relief and testing valve as in claim 1 in which said axial passage in said spool has a cylindrical bore and said plug has a cylindrical portion closely fitting said bore.

4. An engine relief and testing valve as in claim 1 in which said spring mounting means includes a cap removably engaging said valve body and having a shoulder abutting said spring.

5. An engine relief and testing valve as in claim 1 in which both said primary piston and said secondary piston are provided with packing.

(References on following page)

References Cited by the Examiner

UNITED STATES PATENTS

| | | | |
|---|---|---|---|
| 382,643 | 5/1888 | Fox | 137—490 X |
| 2,213,147 | 8/1940 | Parkins et al. | 137—522 X |
| 2,728,547 | 12/1955 | Crookston et al. | 251—63 X |

FOREIGN PATENTS 359,757   6/1938   Italy.

M. CARY NELSON, *Primary Examiner.*

A. ROSENTHAL, *Assistant Examiner.*